Figure 1:
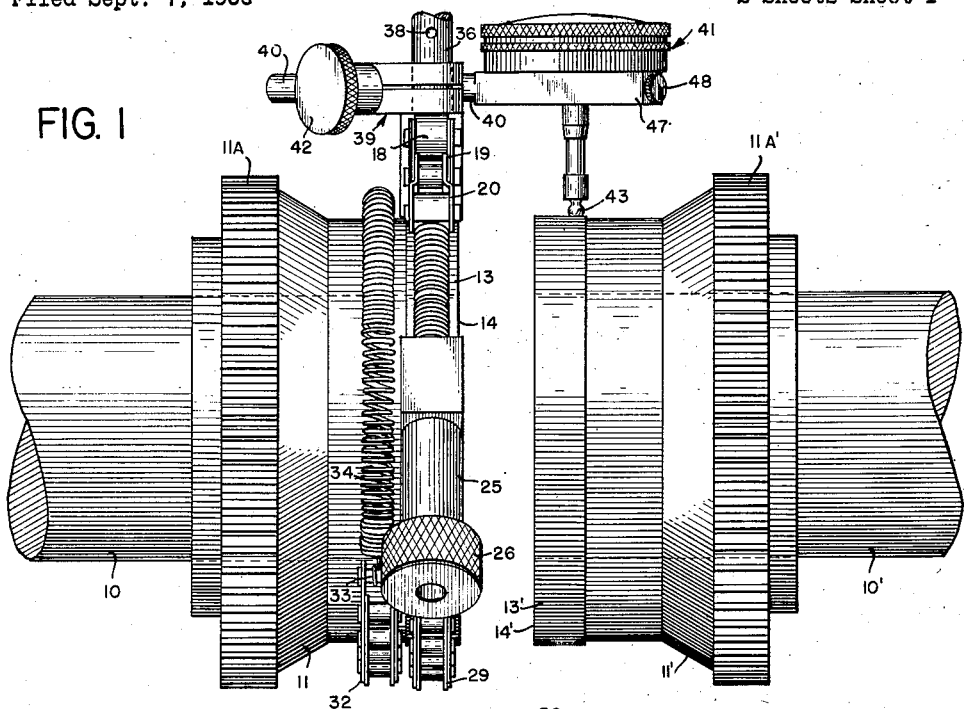

May 6, 1958 J. H. CUNNINGHAM 2,833,051
SHAFT ALIGNING DEVICE
Filed Sept. 7, 1956 2 Sheets-Sheet 1

INVENTOR
J.H. CUNNINGHAM

BY *A. Yates Dowell*
ATTORNEYS

May 6, 1958

J. H. CUNNINGHAM 2,833,051

SHAFT ALIGNING DEVICE

Filed Sept. 7, 1956

2 Sheets-Sheet 2

INVENTOR
J. H. CUNNINGHAM

BY A. Yates Dowell
ATTORNEYS

United States Patent Office 2,833,051
Patented May 6, 1958

2,833,051

SHAFT ALIGNING DEVICE

John H. Cunningham, Baltimore, Md.

Application September 7, 1956, Serial No. 608,623

7 Claims. (Cl. 33—180)

The present invention relates to the alignment of machine shafts and more particularly to the support and mounting of instruments for assisting a skilled mechanic in accurately aligning shafts for obtaining parallel relation and exact alignment of the axes of shafts.

In the manufacture and installation of machines, it is frequently necessary to align shafts of adjacent machines, such as the shaft of a generator must be aligned accurately with the shaft of the motor driving the same. Although various types of couplings are used to compensate for variations in alignment such couplings wear out more rapidly as the misalignment increases and therefore it has been customary to align shafts as accurately as possible. Heretofore, each mechanic has used a different method of aligning shafts, some using a straight edge and others using dial test indicators, the straight edges having been satisfactory for coarse alignment but the dial indicators have been essential for accurate alignment.

The dial indicators, measuring in thousandths of an inch, have been mounted on one shaft with the feeler or contact point engaging the other shaft and by relatively rotating the shafts the mechanic could estimate the degree of misalignment and make the necessary corrections. However, it has been a continuous problem of how to satisfactorily mount the dial indicators on the shafts or on the hub of the shaft coupling so that the dial indicator is fixed relative to its supporting shaft and maintained in such fixed position so that the contact point of the indicator engaging the other shaft or the hub of the shaft coupling on the other shaft will cause an accurate movement of the dial indicator. Frequently this work has been done in an inaccurate manner because of the difficulty of mounting the dial test indicator on the one shaft so as to preclude relative movement between such indicator and its supporting shaft and, consequently, the readings obtained by the mechanic have not been sufficiently accurate so that the mechanic could know the exact amount of misalignment. Consequently, the time required for the process of aligning has been excessive. Also, the actual mounting of the dial indicator on the shaft using previously known apparatus required an excessive amount of time, resulting in high costs for obtaining proper alignment.

An object of the present invention is to overcome the problems and defects of the prior art and to provide supporting structure for a dial test indicator which may be readily applied to and removed from shafts to be aligned.

Another object of the invention is to provide supporting structure and equipment for accurately aligning shafts in a minimum of time and with a high degree of accuracy.

A further object is to provide aligning equipment which will fit many sizes of shafts without change and which can be applied to and removed from the shafts without additional tools.

A further object is to provide a support which will have no lost motion and which will adequately support instruments or other equipment.

Figure 2:
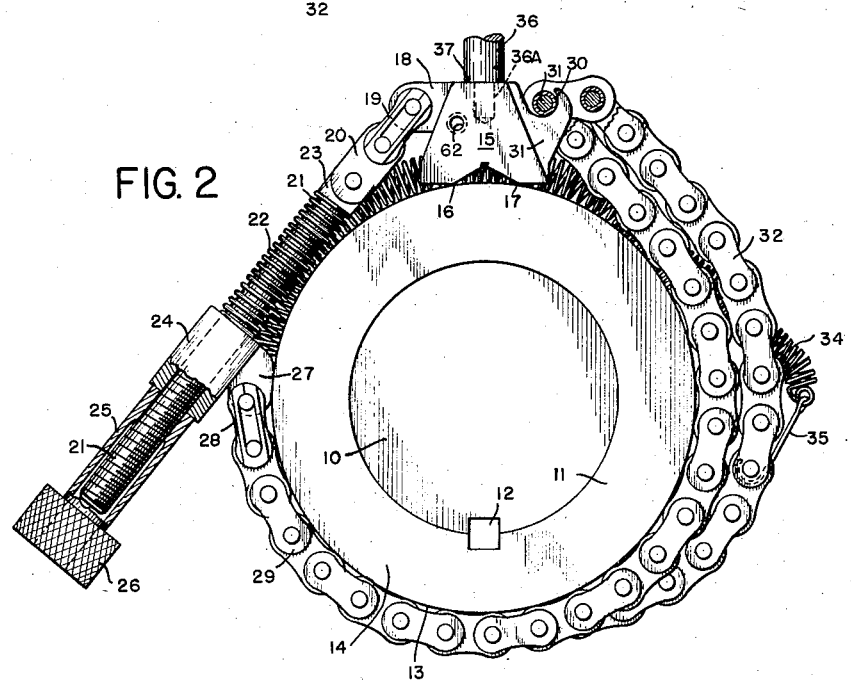
Figure 3:
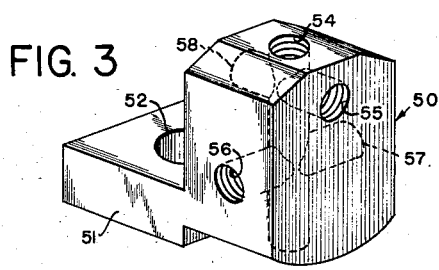
Figure 4:
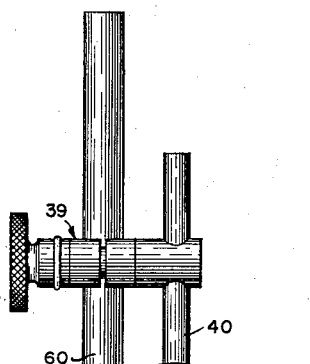
Figure 5:
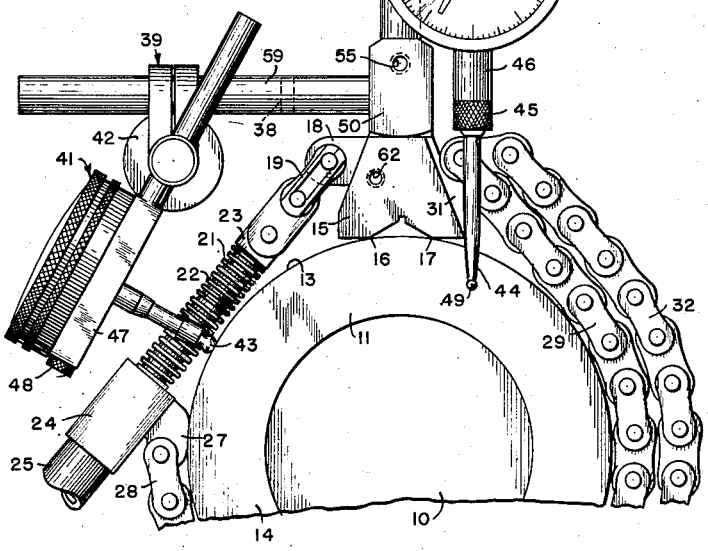
Figure 5:
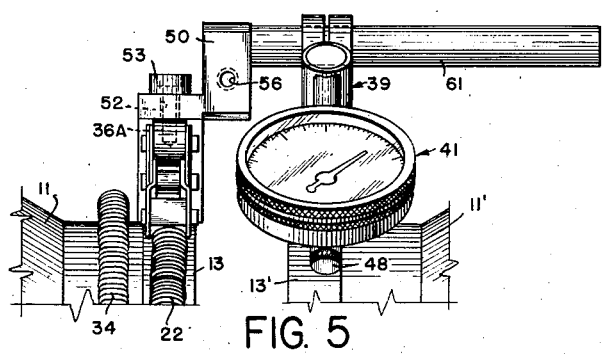

Other and further objects will be apparent as the description proceeds and upon reference to the accompanying drawings wherein:

Fig. 1 is a side elevation of end fragments of a pair of shafts with coupling hubs affixed thereon and with the coupling sleeves omitted and showing the instrument supporting structure of the present invention mounted on one of such hubs for carrying a dial test indicator having its contact point engaging the other hub for measuring eccentric misalignment of the shafts;

Fig. 2, an end view of one shaft and its coupling hub fixed thereon with the mounting clamp structure of the present invention shown in elevation around such hub;

Fig. 3, a supplementary mounting block for use with the clamping structure for obtaining angular adjustments and providing for additional supporting means from the single clamping structure of Figs. 1 and 2;

Fig. 4, a fragmentary end elevation of the supporting shaft with the instrument supporting clamp thereon and a dial test indicator supported therefrom for indicating eccentricity of a shaft, and a second dial indicator supported thereon to indicate angular misalignment of the shafts and showing the supplementary mounting block in use; and Fig. 5, an elevational view illustrating the use of the angular mounting block for supporting the dial test indicator.

Briefly, the aligning means of the present invention includes a V-shaped block having an ear projecting outwardly from one leg adjacent the apex of the V and a screw pivotally connected to such ear. Projecting from the other leg of the V block is a second ear having a hook therein for receiving a cross-bar of a chain. A sleeve slidably mounted on the screw is urged away from the first ear by a compression spring and such sleeve is moved toward the first ear by means of a tubular nut having a knurled knob serving as an operating means for such nut. To the projecting lug on the sleeve a conventional link chain of sufficient length to extend around a shaft or a hub of a coupling on shaft to be aligned is pivotally attached to one end while a tension spring is mounted on the other end of such chain with a hook at the free end of the tension spring.

The chain is wrapped around the shaft or hub so that one crossbar or roller of the chain engages in the hook of the second ear of the V-shaped block, after which the tubular nut is tightened drawing the sleeve toward the first mentioned ear and securely drawing the chain around the hub clamping the V-shaped block on the shaft or the coupling hub. The tension spring with the excess chain is then wrapped around the shaft and the hook on the end of the spring engages one of the links of the chain, thereby retaining the excess of the chain in close relation to the shaft to prevent contact of the chain with any surrounding obstructions. The V-shaped block is provided with one or more threaded apertures for receiving and retaining a mounting bar, and on such mounting bar a dial test indicator is supported so its contact point engages the shaft or a hub of the other shaft which is to be aligned To provide for additional adjustment an angular mounting block is provided for attachment to the V-shaped block and such angular block is provided with threaded apertures for receiving mounting bars on which dial test indicators may be supported to provide for locating the contact points of the indicators in accurate position and so that two dial test indicators may be simultaneously supported, thereby increasing the speed with which the alignment can be made.

Referring more specifically to the drawings, upon a first shaft 10, such as the shaft of a motor, a coupling element 11 is mounted in fixed relation by means of a key 12 or the like, such coupling element being fixed to the shaft by having been shrunk thereon, said coupling element having a machined hub portion 13 thereon and an accurately machined plane face 14 normal to the axis of the shaft. A similar shaft 10', such as the shaft of a generator, carries a coupling element 11' having a hub portion with an accurately machined surface 13' and an accurately machined plane face 14' normal to the axis of shaft 10', with the coupling element 11' shrunk on the shaft and fixed against rotation by a key. Cooperating with the coupling elements 11 and 11' a two part coupling sleeve (not shown), with internal teeth, is provided for obtaining a driving connection between the teeth 11A on the coupling element 11 and the teeth 11A' on the coupling element 11', as will be understood from the conventional use of couplings for driving one shaft from another.

The shaft aligning device of the present invention includes a V-shaped block 15 in which the interior angle of such block is shown to be obtuse and with the projecting ends of the legs being substantially at a straight angle providing sharp edges 16 and 17 which engage the accurately ground cylindrical periphery 13 of the coupling 11. Projecting outwardly from one side of the V-shaped block 15 is an ear 18 having an aperture therethrough which cooperates with a separable connecting link 19, connected to a link 20, which is pivotally connected to one end of a screw 21. The shank of the screw 21 is surrounded by a compression coil spring 22 which exerts a force between an integral shoulder 23 on the screw and a slidable sleeve 24 mounted on such screw. An internally threaded tubular type nut 25 mounted on the screw 22 and operable by a knurled knob 26 serves to move the sleeve 24 toward the shoulder 23 while the spring 22 urges the sleeve 24 away from such shoulder.

Secured to the sleeve 24 is a lug 27 having an aperture therethrough cooperating with a connecting link 28 securing a length of chain 29 thereto, such length of chain 29 being of sufficient length to encompass the shafts or coupling hubs of varying sizes. One of the links of the length of chain 29 is received in a hook 30 formed in an ear 31 projecting from the opposite side of the V-shaped block 15, and when a selected chain roller or pin 31 of the chain 29 is positioned in the hook 30 and tubular nut 26 is screwed up, compressing spring 22 and drawing the chain 29 tightly around the machined surface 13 of the hub coupling. The edges 16 and 17 of the V-block are forced tightly against such machined surface 13 and the block 15 is securely retained in position precluding any lost motion in the support of such block.

It will be noted that the tensile force of the chain on the block 15 is applied at an appreciable distance radially outwardly of the surface 13 and such force against the sharp corners at 16 and 17 provide a high pressure contact radially inward on shaft 10, and it has been found that this results in a secure mounting of the block 15 under forces which can be readily exerted by a person manually operating the adjusting knob 26 of the nut 25, thereby avoiding the need for any tools.

It will be noted that the chain 29 has an additional section 32 extending from the hook 31, and at the extreme end pin 33 of such additional section of chain 32 one end of a tension coil spring 34 is secured, while secured to the other end of the coil spring 34 is a hook 35 adapted to engage with any roller or pin of the chain 32, to attach the free end of the chain in place and avoid interference with the rotation of the shaft or with instruments on the V-shaped block 15.

Referring to Figs. 1 and 2, a reduced threaded extension of a mounting bar 36 is screw-threaded into a radially located threaded aperture 36A in the apex of the V-shaped block with a shoulder 37 of the mounting bar engaging the block so that the mounting bar 36 is positively secured when it is turned by suitable means such as an elongated pin, or the like, passing through a transverse aperture 38 in the mounting bar for positively turning the bar 36 for fixed measurement to the V-block 15.

Upon the mounting bar 36 a clamp generally indicated by reference numeral 39 and conventionally furnished with "Lufkin" dial indicators is slidably mounted on the mounting bar 36 and slidably receives a mounting shank 40 projecting from one end of a dial test indicator 41, the clamp 39 having a thumb screw 42 by means of which the clamp 39 grips both the mounting bar 36 and the shank 40. This clamp 39 is positioned and adjusted so that the contact point 43 of the dial test indicator will engage the accurately machined portion 13' of the coupling member 11'.

It will be obvious that when the shaft 10 carrying the dial test indicator is rotated while the shaft 10' is held stationary that the contact point 43 will be moved radially inwardly or outwardly relative to the axis of the shaft 10 if the axis 10' is not concentric with the axis of shaft 10 and from this reading the machinist can determine how many shims to add or take away from the support for the generator or motor or other machine carrying shaft 10'. The actual adjustment is dependent upon the size of the shim and the strain put on the bolts as is well known in the trade.

It will be evident that the coupling elements 11 and 11' respectively are fixed on the shaft 10 and 10' so as to be accurately centered thereon and so that the machined hub portions 13 and 13' are concentric with the axis of its shaft while the surfaces 14 and 14' are accurately positioned in radial planes on the respective shafts. Assuming that eccentricity of the shaft 10 and 10' is corrected, it is important that the axis of shafts 10 and 10' lie in a straight line and this relation is roughly determined by the use of a straight edge which engages the accurately machined cylindrical hub surfaces 13 and 13'. To accurately align the shafts, the dial indicator 41 having the usual feeler finger 44 which is swively mounted in a ball socket joint 45 on the end of a tubular extension 46 which is screwed into the other end 47 of the dial test indicator is mounted by means of the mounting shank 40 and clamp 39 to a mounting bar 6D. The feeler finger 44 is received in a recess of the shank supporting the contact point 43 (Fig. 1) so that the feeler finger 44 provides a lever having an equal length extending in each direction from the ball and socket joint 45 whereby the single dial test indicator 41 may be used both for measuring the eccentricity and measuring angular alignment.

It will be noted that a removable plug 48 is screwed into the end 47 of the dial test indicator when the feeler finger 44 is removed. It will be evident that the dial test indicaor with the feeler finger 44 may be mounted directly on the mounting bar 36 by means of the clamp 39 but frequently the arrangement is such that the tip 49 of feeler finger 44 may not contact the desired portion of the surface 14' and therefore it is desirable to have means to mount the dial test indicator outwardly of the mounting block 15 and also it is frequently desirable to be able to angularly adjust the mounting of the dial test indicator 41 so that its contact point 43 will be in radial alignment with the shank thereof and that the shank of the contact point 43 is exending radially from the axis of the shaft being aligned. One way of accomplishing this mounting is by means of an angle bracket 50 having a plate portion 51 with an aperture 52 therethrough which receives a mounting screw 53 (Fig. 5) which is received in the threaded aperture 36A in the mounting block 15 to provide for swinging movement of the angle member 50. The angle member 50 is provided with threaded bores 54, 55, 56, 57 and 58 for receiving suitable mounting bars which may be duplicates of the mounting bar 36 or may be of various lengths but the threads of such bores are the same as the threads of the bars to provide for interchange of the mounting bars.

A mounting bar 59, as shown in Fig. 4, carries a mounting clamp 39 which carries the dial test indicator 41 so that its contact point 43 engages the machined hub portion 13' of the coupling 11' and it will be evident that by suitably swinging the angle bracket 50 that the contact end 43 by dial test indicator 41 may be properly positioned so that the clamp 49 and the shank thereof extends radially from the axis of the shaft being aligned, swivel movement in two directions being obtained by the proper adjustment of clamp 39, as is well known.

A mounting bar 60 (Fig. 4) is mounted in the threaded bore 54 of the angle member 50 and by a clamp 39 engaging shank 40 carries a dial test indicator 41 with a feeler finger 44 as previously described thereby permitting the two dial test indicators to be in operative position at the same time and permitting simultaneous reading of the angular disalignment as well as the eccentricity so that both corrections can be made at the same time.

Referring to Fig. 5, a mounting bar 61 is shown threaded into the threaded aperture 55 of the angle member 50 and carrying the dial test indicator 41 showing how this arrangement is particularly suitable for use with shafts having substantial space between the ends thereof and also adapting the invention for use where the shafts are close together, this being permitted by the mounting of the bar 61 in the threaded aperture 58 of the angle bracket 50 so that the angle bracket may be swung through an angle of 180° from that shown making it possible to more closely position the dial test indicator to the coupling element 11.

It will be noted that the angle block 15 is provided with a threaded bore 62 in which a mounting bar 36 may be located thereby providing for the use of the apparatus in more confined areas.

From the above description, it is believed that the operation and utility of the present invention should be obvious. In use the parts are all secured together and there is no danger of loss of the parts when the clamp is removed from the shafts. The V-shaped mounting block 15 is positively held in position by means of the chain 29 and the tightening action obtained by the tubular nut 26 with the reaction of the chain on the block 15 being spaced well above the periphery of the cylindrical surface 13 thereby applying a strong radial clamping pressure on the small areas of contact 16 and 17 of the block 15. The dial test indicators on the mounting bar 36 or on the other mounting bars supported in angle bracket 50 provide for such universal adjustment in all directions as to make the apparatus particularly efficient and desirable for use in limited space and the excess length of chain being retained in position by the spring 34 avoids the requirement for manually removing links of the chain and provides for the present invention being used with shafts having a large range of diameters. The indicators can be mounted without the use of any mounting tools and by the use of a pin or nail as a handle passing through the aperture 38 provided in the mounting bar 36, the bars 36 can be screwed tightly in the mounting block 15 or in angle bracket 50. The angle bracket 50 provides for many arrangements with respect to angular relation of the parts providing for universal adjustment and with the conventional mounting clamp 39 the usefulness of the invention is increased and the number of man hours required for making the alignment of the shafts is reduced.

In using the present invention it is preferable to first align the shafts so that the axes of the shaft 10 and shaft 10' are parallel and this alignment is made by the arrangement of the dial indicator with the feeler finger 34 engaging the face 14' of the coupling 11 when the shaft 10 and the dial indicator thereon are rotated relative to shaft 10' and noting any variations in reading, thereby determining the amount of angularity and how to correct the angularity. Thereafter, the correction is made for the eccentricity by reading the dial indicator having its contact point 43 engaging the accurately machined cylindrical surface 13'. When the reading is made to determine the eccentricity the correction is made according to half of the difference between the two readings and it is important that the shank carrying the contact point 43 be substantially radial to the axis of the shaft 10' so that the reading will be an accurate measurement of the amount of eccentricity, and with the present arrangement the mounting of the indicator can be accurately done because of the universal adjustment permitted by the mounting means.

It will be evident that the forces produced by the clamping action on the parts are applied tangently to the cylindrical surface shaft or coupling and that the screw is arranged to apply the force without any objectionable binding effect on the screw.

It will be obvious to those skilled in the art that various changes may be made in the invention without departing from the spirit and scope thereof and therefore the invention is not limited by that which is illustrated in the drawing and described in the specification, but only as indicated in the appended claims.

What is claimed is:

1. Shaft aligning mechanism comprising a V-shaped block with the interior angle of the V being arranged at an obtuse angle and having the extremities of the legs thereof at substantially a straight angle, a laterally projecting ear extending outwardly from one side of said block and remote from the free ends of the legs and having a link receiving aperture located outwardly a substantial distance from the free end of the adjacent leg of said block, a hook-shaped ear on the other side of said block remote from the free end of the adjacent leg, a screw, a link connecting said screw to said first ear, a slidable sleeve on said screw, a spring between said slide and said link, an interiorly threaded tubular nut mounted on said screw for moving said slidable sleeve toward said link, a chain pivotally mounted on said slidable sleeve, said chain being adapted to extend around a coupling or shaft and have one of its cross members hooked in said hook shaped ear, a tension spring fixed at one of its ends to the free end of said chain, a hook on the other end of said tension spring for engagement with one of the cross members of said chain to provide for securing the loose end of the chain in close relationship to the shaft or coupling on which the device is mounted, said V-shaped block being maintained in fixed relationship by the adjustable nut which may exert a strong force radially inwardly toward said shaft, and means to support a dial test indicator from said V block so that the contact point thereof will move radially with respect to an adjacent shaft or coupling to be aligned with the shaft on which the V block is mounted.

2. The invention according to claim 1 in which an L-shaped bracket is pivotally mounted by one leg thereof on the outer extremity of said V-shaped block, and means are provided for maintaining a plurality of dial test indicators so that one indicator will indicate eccentric relationship between adjacent shafts and the other dial test indicator will indicate angular relation between adjacent shafts.

3. A dial test indicating equipment comprising a block having a V-shaped notch therein for contacting a cylindrical surface, an ear on each side of said block spaced outwardly from said V-shaped notch, a screw, means to pivotally secure one end of said screw to one of said ears, a link chain, means to slidably mount one end of said chain on the other end of said screw, a nut for engaging the slidable mounting means for tightening the chain on said screw, the other ear of said V-shaped block being adapted to receive any cross link of the chain to provide adjustment for mounting on various sizes of shafts or the like and, the screw being of sufficient length to accommodate for tightening the chain around a shaft or shaft coupling of widely varying dimensions, means on the free end of the chain to secure the remainder of the chain around the shaft in a position which will not interfere with the motion of the shaft, and means to universally mount dial test indicators on said V-shaped block so that the readings of such dial test indicators will accurately show the amount of eccentricity and the amount of disalignment of the shafts.

4. The invention according to claim 3, in which a pair of dial indicators are mounted to provide for simultaneous readings.

5. The invention according to claim 4 in which the nut is provided with an operating handle and the indicating equipment may be mounted without the use of tools.

6. A mounting block for use in aligning shafts comprising a V-shaped block having a sharp interior angle therein, the edges of the surface forming the angle being abruptly cut off relative to the angle to provide sharp edges, said V-shaped block being of appreciable thickness in the direction of said sharp edges to engage an accurate machined surface on a shaft or shaft coupling, means to permanently and pivotally secure a screw to the V-shaped block on an axis substantially parallel to said sharp edges and at a substantial distance to one side of and outwardly from the apex of the V-shaped notch, hook means approximately opposite said pivotal securing means and spaced laterally and outwardly in the opposite direction from the apex of said V-shaped notch, said hook being constructed to receive a cross link of a chain, a slidable sleeve mounted on said screw and pivotally connected to one end of a chain so that the chain may extend from said slide around a shaft or shaft coupling so that a cross link thereof may engage the hook of said mounting block and a hand manipulatable nut on said block and abutting against said slidable sleeve for drawing said notched block in fixed relation to a shaft, the connection of said chain to said slidable sleeve including a lug adapted for engagement against a shaft to maintain the screw against contact with the shaft whereby the slide may freely move and securely maintain said block in fixed position, and means to mount test instruments on said block whereby said test instruments will be fixed relative to the shaft on which said block is mounted.

7. Test equipment comprising a block having a V-shaped dihedral notch therein for contacting a cylindrical surface, a screw pivotally mounted on one end of said V-shaped block on an axis extending in the same general direction as the intersection of the planes forming the dihedral, means to adjustably mount a chain on said screw, means to mount another portion of the chain on the block on the opposite side of the dihedral notch from the pivotal mounting of said screw and in generally symmetrical relation to the pivotal mounting of said screw, means to adjust the length of the chain between said mount of the said other portion of the chain and the adjustable mount of said chain on said screw, means to support any excess length of chain closely adjacent the adjusted length of chain whereby the equipment will occupy a minimum of space permitting the shaft to rotate, and means to support testing devices on said block permitting accurate aligning.

References Cited in the file of this patent

UNITED STATES PATENTS

| | | |
|---|---|---|
| 1,940,910 | Hickey | Dec. 26, 1933 |
| 2,455,024 | Schneider | Nov. 30, 1948 |
| 2,482,783 | Longworth | Sept. 27, 1949 |
| 2,545,784 | Kenner | Mar. 20, 1951 |
| 2,585,343 | Newlon | Feb. 12, 1952 |
| 2,637,907 | Aubrey et al. | May 12, 1953 |
| 2,711,935 | Miles | June 28, 1955 |

FOREIGN PATENTS

| | | |
|---|---|---|
| 596,816 | Germany | May 11, 1934 |